United States Patent
Manners et al.

(10) Patent No.: US 10,930,009 B2
(45) Date of Patent: Feb. 23, 2021

(54) GEOLOCATION SYSTEM

(71) Applicant: Ordnance Survey Limited, Southampton (GB)

(72) Inventors: Timothy James Manners, Southampton (GB); James Anthony O'reilly, Southampton (GB)

(73) Assignee: Ordnance Survey Limited, Southampton (GB)

( * ) Notice: Subject to any disclaimer, the term of this patent is extended or adjusted under 35 U.S.C. 154(b) by 143 days.

(21) Appl. No.: 16/222,220

(22) Filed: Dec. 17, 2018

(65) Prior Publication Data

US 2019/0197726 A1 Jun. 27, 2019

(30) Foreign Application Priority Data

Dec. 22, 2017 (EP) .................................... 17210316

(51) Int. Cl.
*G06T 7/73* (2017.01)
*G06F 16/2452* (2019.01)
*G01C 21/30* (2006.01)
*G06F 16/29* (2019.01)
*G06T 7/50* (2017.01)
(Continued)

(52) U.S. Cl.
CPC .............. *G06T 7/73* (2017.01); *G01C 21/005* (2013.01); *G01C 21/30* (2013.01); *G06F 16/2452* (2019.01); *G06F 16/29* (2019.01); *G06T 7/50* (2017.01); *G06T 7/60* (2013.01); *G06T 2207/30184* (2013.01); *G06T 2207/30188* (2013.01); *G06T 2207/30256* (2013.01)

(58) Field of Classification Search
None
See application file for complete search history.

(56) References Cited

U.S. PATENT DOCUMENTS

2006/0217879 A1* 9/2006 Ikeuchi .................. G01C 21/32
 701/409
2013/0201365 A1 8/2013 Wirola et al.
(Continued)

OTHER PUBLICATIONS

Costea, Dragos et al., "Aerial Image Geolocalization from Recognition and Matching of Roads and Intersections," Cornell University Library, Ithaca, NY., May 26, 2016, 6 pages.
(Continued)

*Primary Examiner* — Fayyaz Alam
(74) *Attorney, Agent, or Firm* — Banner & Witcoff, Ltd.

(57) ABSTRACT

A computer-implemented method and system for determining the geographical location of a user based on the characteristics of intersecting features, such as a road intersection. Specifically, the geometry of each intersection in a geographical area is used to derive a unique fingerprint for each individual intersection, the fingerprint comprising information relating to the geometry, the geographical location of the intersection, and other characteristics. These fingerprints can then be stored locally to a device, for example, a mobile phone, a tablet, a wearable computing device, an in-vehicle infotainment (IVI) system and the like. To determine the geographical location of the device, the geometry of a nearby intersection may be analysed by some means and compared to the stored set of unique fingerprints to identify the intersection and its associated location.

17 Claims, 6 Drawing Sheets

(51) Int. Cl.
*G01C 21/00* (2006.01)
*G06T 7/60* (2017.01)

(56) References Cited

U.S. PATENT DOCUMENTS

| | | | |
|---|---|---|---|
| 2013/0311047 A1* | 11/2013 | Denaro | G01C 21/26 |
| | | | 701/45 |
| 2014/0153773 A1* | 6/2014 | Gupta | G06K 9/6202 |
| | | | 382/103 |
| 2015/0133146 A1 | 5/2015 | McClendon | |
| 2016/0192154 A1 | 6/2016 | Modica et al. | |
| 2019/0383630 A1* | 12/2019 | Lee | G01C 21/34 |

OTHER PUBLICATIONS

Weyand, Tobias et al., "PlaNet—Photo Geolocation with Convolutional Neural Networks," Feb. 17, 2016, 10 pages.
Mar. 7, 2018—(EP) Extended Search Report—App 17210316.0.

* cited by examiner

GEOLOCATION SYSTEM

CROSS-REFERENCE TO RELATED APPLICATIONS

This application claims priority to United Kingdom application no. 17210316.0 filed Dec. 22, 2017, having the same title, herein incorporated by reference in its entirety for all purposes.

FIELD

Embodiments of the present invention relate to a computer implemented method and system for determining a geographical location. In particular, the present invention relates to the identification of a geographical location based on the characteristics of intersecting features.

BACKGROUND

Many mobile computing devices and systems track their geographic location by making use of global navigation satellite systems (GNSS) such as Galileo or the Global Positioning System (GPS), telecommunication networks or other geolocation or positioning services. For example, mobile phones, tablets, wearable computing devices and in-vehicle infotainment (IVI) systems all make use of some form of geolocation or positioning.

However, there are times when such location methods have reliability, accessibility and authenticity issues, thus making it difficult for the user of the device to determine their current location. Therefore, it is desirable to have an alternative location method for use when the usual navigation system is unavailable, for example, when in a remote location with no network or satellite signal available.

It has been found that combinations of lines, objects and geometries in topographic map data can provide unique patterns. For example, the geometry of individual road intersections can be used to generate unique fingerprints, as will be described in more detail below. By comparing such patterns to the user's immediate surroundings, it is possible to identify a user's current location without requiring the use of other geolocation or positioning services, specifically, those that require a connection to some other system.

Various ways of achieving geolocation without network coverage have been proposed. In one known method, geolocation is provided by using convolutional neural networks to identify roads and intersections from aerial images. Another known method also uses convolutional neural networks at ground level by identifying various features in images, such as landmarks, weather patterns, vegetation, road markings and architectural details.

SUMMARY

Embodiments of the present invention address the above noted problems by providing a computer-implemented method and system for determining a geographical location of a user based on the characteristics of intersecting features, such as a road intersection. Specifically, the geometry of each intersection in a geographical area is used to derive a unique fingerprint for each individual intersection, the fingerprint comprising information relating to the geometry, the geographical location of the intersection, and other characteristics. These fingerprints can then be stored locally to a device, for example, a mobile phone, a tablet, a wearable computing device, an in-vehicle infotainment (IVI) system and the like. To determine the geographical location of the device, the geometry of a nearby intersection may be analysed by some means and compared to the stored set of unique fingerprints to identify the intersection and its associated location. The geometry of the nearby intersection may be obtained and analysed in a number of different ways. For example, an image of the intersection may be taken using the device and processed to determine the geometry of the intersection, as well as other characteristics if required. Other sensor data may be used, as an alternative or in addition, to determine the geometry of the intersection, for example, by using a compass feature on the device to measure the bearings between the roads of the intersections.

A first aspect of the present invention provides a computer-implemented method of geolocation, the method comprising storing a set of unique identifiers corresponding to a plurality of intersections located in a geographic area, an intersection being a point at which three or more features meet, wherein an identifier comprises information relating to one or more characteristics of the corresponding intersection and a geographical location, obtaining data relating to a first intersection of unknown geographic location, processing the received data to determine one or more characteristics of the first intersection, comparing a characteristic of the first intersection to a characteristic of the set of unique identifiers, and identifying an identifier having the same characteristic as the first intersection and determining the geographic location of the first intersection therefrom. As such, the individual characteristics of intersecting features may be used to create unique identifiers that may be stored in a device and used to identify the location of the device based on the characteristics of a nearby intersection in situations when the usual navigation system is unavailable, for example, when in a remote location with no network or satellite signal available.

The characteristics may comprise geometric data relating to a geometric measurement of an intersection. For example, the geometric data may comprise an angular position of the three or more features about the point of intersection. That is to say, it is possible to identify a particular intersection based on the bearings between the features extending therefrom.

The geometric data may further comprise a length of at least a part of the three or more features. That is, the geometric data may include a distance along a part of the feature measured from the point of intersection.

The obtaining data relating to a first intersection may comprise capturing one or more images of the first intersection, wherein the processing the data comprises processing the one or more images to determine the characteristics of the first intersection. For example, the user may use the camera embedded in their mobile computing device, or the on-board camera of their vehicle, to capture images of a nearby intersection. These images may then be analysed to measure, for example, the bearings between the intersecting features, and then compared to the stored set of unique identifiers to determine the location of the intersection.

The obtaining data relating to a first intersection may also comprise using at least one sensor to obtain a geometric measurement of the first intersection, wherein the at least one sensor comprises a magnetometer and/or an accelerometer. For example, the user may use the compass feature of their mobile computing device to measure the bearings between a number of nearby features intersecting at a common point, and the compare these measurements to the stored set of unique identifiers to determine the location of the intersection.

The method may further comprise generating the set of unique identifiers based on a topographic dataset, wherein an intersection is represented by a node having three or more line features extending therefrom, wherein the generating the set of unique identifiers may further comprise obtaining a geometric measurement of the three or more line features. Said geometric measurement may comprise an angular position of the three or more line features about the node, and a length of at least a part of the three or more line features.

The line features may be representative of one or more of: a road, a path, a river, a hedge, a bridge and a railway track. The line features may also represent features of various utility networks such as power lines, gas pipelines, water pipelines, telephone lines, data communication networks and the like. The line features may also represent features of indoor networks such corridors and doorways within a building, or the spaces and roadways of a carpark.

The characteristics may further comprise one or more of: a road sign, a building, a man-made structure, vegetation and a landmark.

Another aspect of the present invention provides a computer-implemented method of determining the geographical location of a user based on the geometry of intersections, wherein the geometry of a plurality of intersections in a geographical area is used to derive a plurality of unique fingerprints corresponding to the plurality of intersections, each fingerprint comprising information relating to the geometry and the geographical location of an intersection, and wherein the geometry of an intersection of unknown location is measured and compared to the plurality of unique fingerprints to determine the location thereof.

A further aspect of the present invention provides a system comprising a processor, and a computer readable medium storing one or more instruction(s) arranged such that when executed the processor is caused to perform the method outlined above.

BRIEF DESCRIPTION OF THE DRAWINGS

Further features and advantages of the present invention will become apparent from the following description of embodiments thereof, presented by way of example only, and by reference to the drawings, wherein.

DETAILED DESCRIPTION OF THE DRAWINGS

Figure 1:
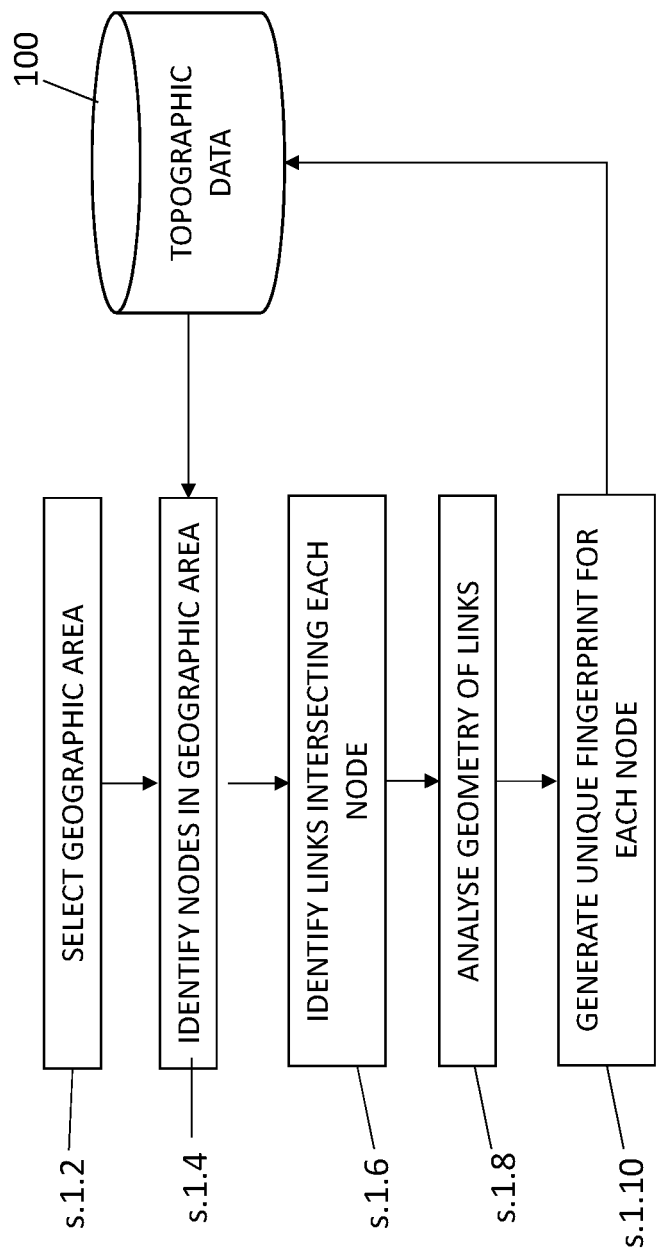
FIG. 1 is a flow diagram illustrating a method of obtaining data for use in the present invention.

As noted above, the geometry of intersecting features can be used to generate unique fingerprints. FIG. 1 illustrates a method of obtaining unique fingerprints for a plurality of intersecting features, such as road intersections, in a particular geographical area. In the first step s.1.2, a geographic area is selected, for example, a country or region. Topographic map data is then extracted from a topographic map database 100 and used to identify all of the nodes in the selected geographic area (s.1.4), wherein the nodes represent an intersection with three or more line features extending therefrom, for example, an intersection or junction where three or more roads or paths meet, the point at which two rivers cross, the point at which two rail lines cross, or any other type of intersecting topographic line features. Other examples of intersecting line features include features of various utility networks such as power lines, gas pipelines, water pipelines, telephone lines, data communication networks and the like. The line features may also represent features of indoor networks such corridors and doorways within a building, or the spaces and roadways of a carpark.

Figure 2:
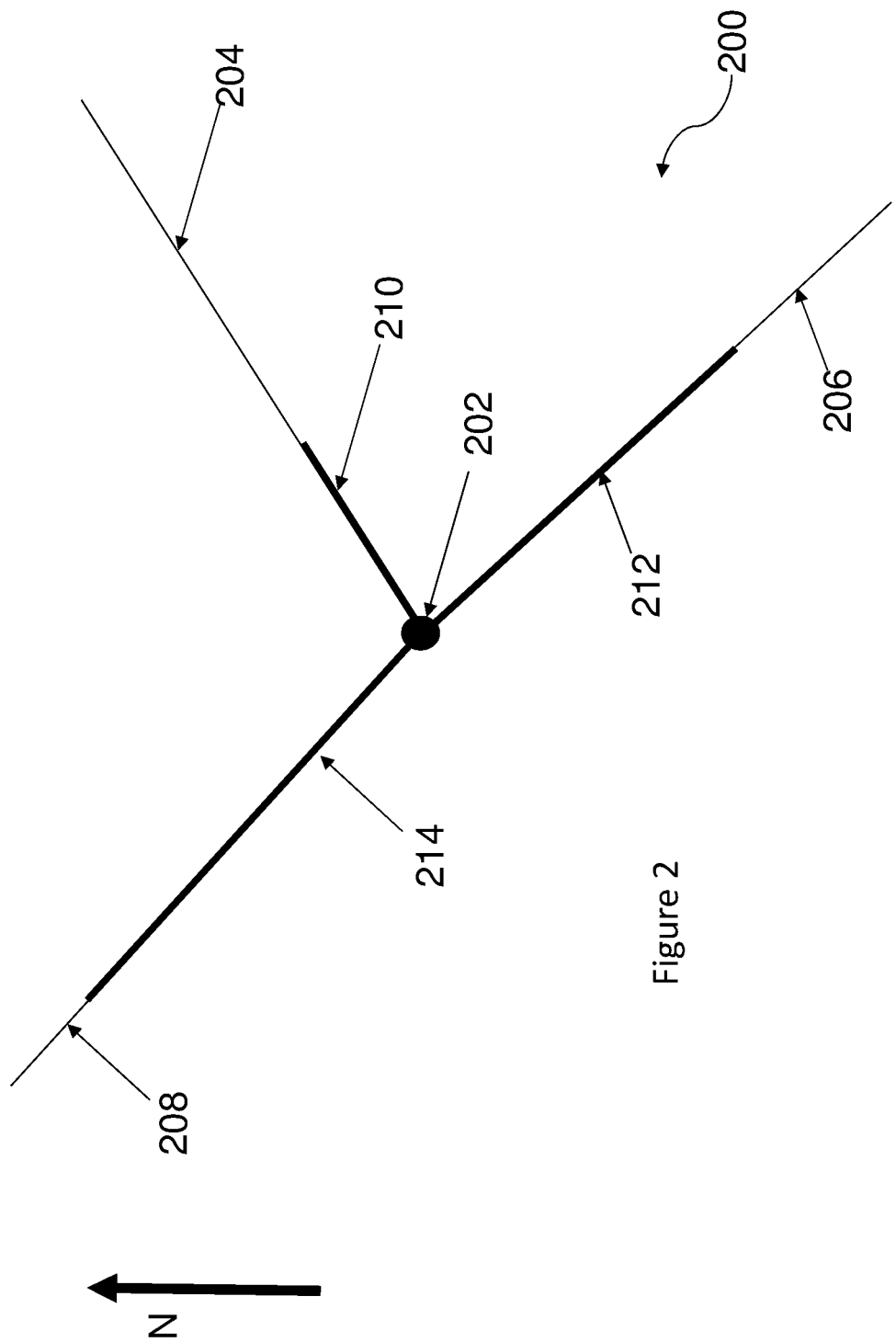
FIG. 2 is a diagram illustrating an example of the method of FIG. 1.

In the example arrangement 200 shown in FIG. 2, a node 202 connects a first line feature 204, a second line feature 206 and a third line feature 208. The line features 204, 206, 208 are made up of an ordered string of points linked together. The distance between these points, that is the length of the links, can vary in size depending on the shape and type of feature. For example, a long stretch of straight motorway may only be made up of two or three points with several kilometres therebetween, whereas a short, winding country road may be made up of several points with a few metres therebetween.

For each node 202, the first link 210, 212, 214 along each of the intersecting line features 204, 206, 208 is then identified (s.1.6), that is, the link from the node 202 to the first point making up the geometry of the line feature 204, 206, 208. The geometry of these links is then analysed (s.1.8), specifically, the length and bearing of the links 210, 212, 214. In this respect, the length of the links 210, 212, 214 will be measured based on the 3-dimensional coordinates of the first point along each of the line features 204, 206, 208, so that the height of the point is also taken into account. The bearing of the links 210, 212, 214 is the angular position of the link 210, 212, 214 measured about the node 202.

For example, the first link 210 of the first line feature 204 may have a length of 9.61514 metres and a bearing of 56.31159° from north, the first link 212 of the second line feature 206 may have a length of 19.19382 metres and a bearing of 155.36581° from north, the first link 214 of the third line feature 208 may have a length of 21.63423 metres and a bearing of 326.30993° from north. It will be appreciated that FIG. 2 is not drawn to scale and that these values are provided for example purposes only.

Based on the geometry data of each link 210, 212, 214 intersecting a node 202, a fingerprint is then generated for each node 202 (s.1.10). The fingerprint will include information relating to the geometry data and the geographic location of the node 202. Each fingerprint has a uniqueness of around 99.6%, although this uniqueness can be increased by incorporating other features of the area surrounding the node 202. For example, other topographic features such as road signs, buildings, man-made structures such as pylons, vegetation, landmarks and the like located in the vicinity of the node 202 may be identified and incorporated into the fingerprint.

Once generated, the fingerprints can then be stored in the topographic database 100 or any other database for distribution to one or more users, as will be described in more detail below.

Figure 3:
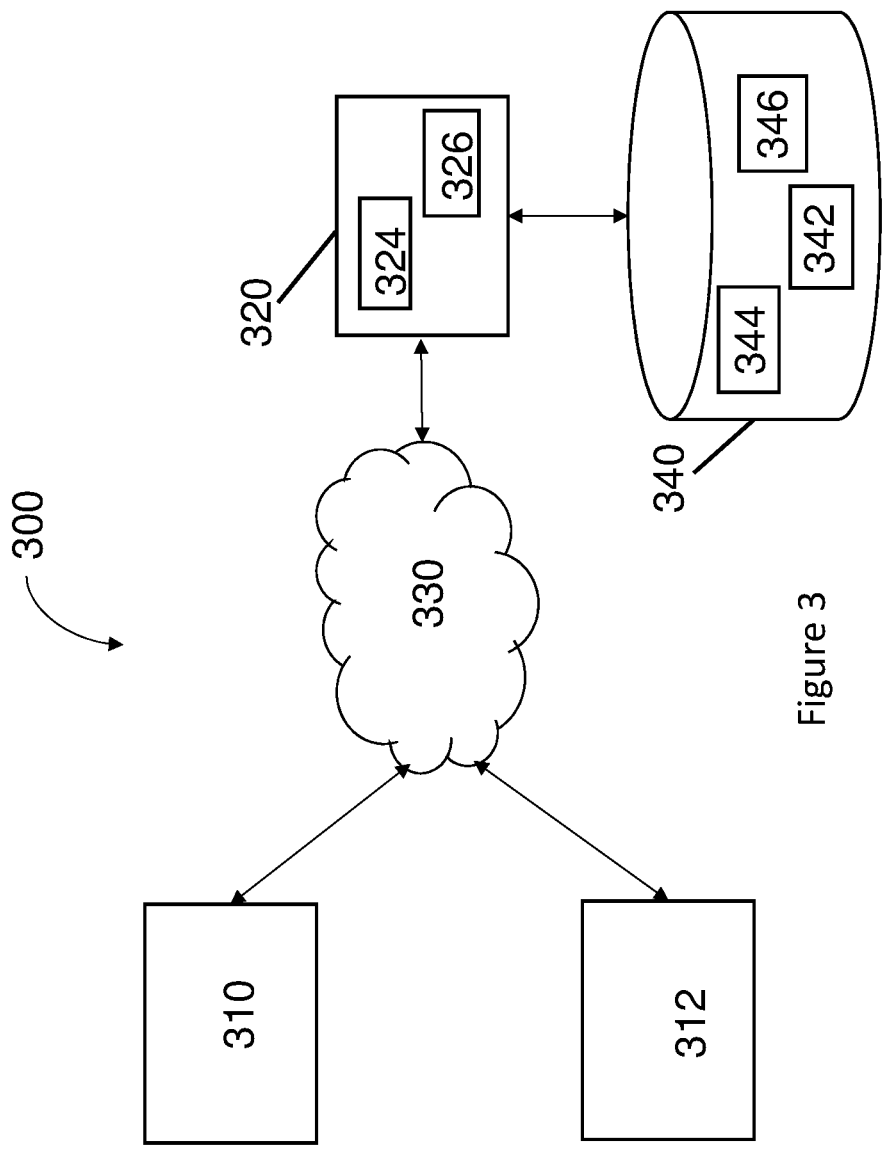
FIG. 3 is a block diagram illustrating an example system used to implement the method of FIG. 1.

FIG. 3 illustrates one example of a system used to implement the method described in detail above, and reference should be made to the above when considering the various steps and processes described below.

FIG. 3 shows a system 300 comprising a server 320 in communication with third party servers 310, 312 via a network 330 through a communications interface 324. The server 320 comprises a processor 326 arranged to carry out computing operations, and is also in communication with a core server 340. The core server 340 runs different software implemented modules which carry out different tasks or provide particular data when required by the processor 326. More specifically, a topographic data module 342 contains the topographic map data including nodes, line features, and other topographic features. An intersection analysis module 344 is arranged to carry out the necessary steps to identify nodes and the intersecting line features in a particular geographic location, and then analyse the geometries of those features, as described above. Once the geometry data for each node has been generated, a fingerprint module 346 is arranged to generate unique fingerprints for each node in a particular geographic area, each fingerprint including the geometry data of each node as well as data identifying the geographic location to which it relates.

The server 320 is arranged to receive a request for fingerprint data via network 330 from the third party servers 310, 312 (for example, the server on which the user's device is running). This information is then be distributed to the third party servers 310, 312 and stored on user's device for future use, as will be described below.

Figure 4:
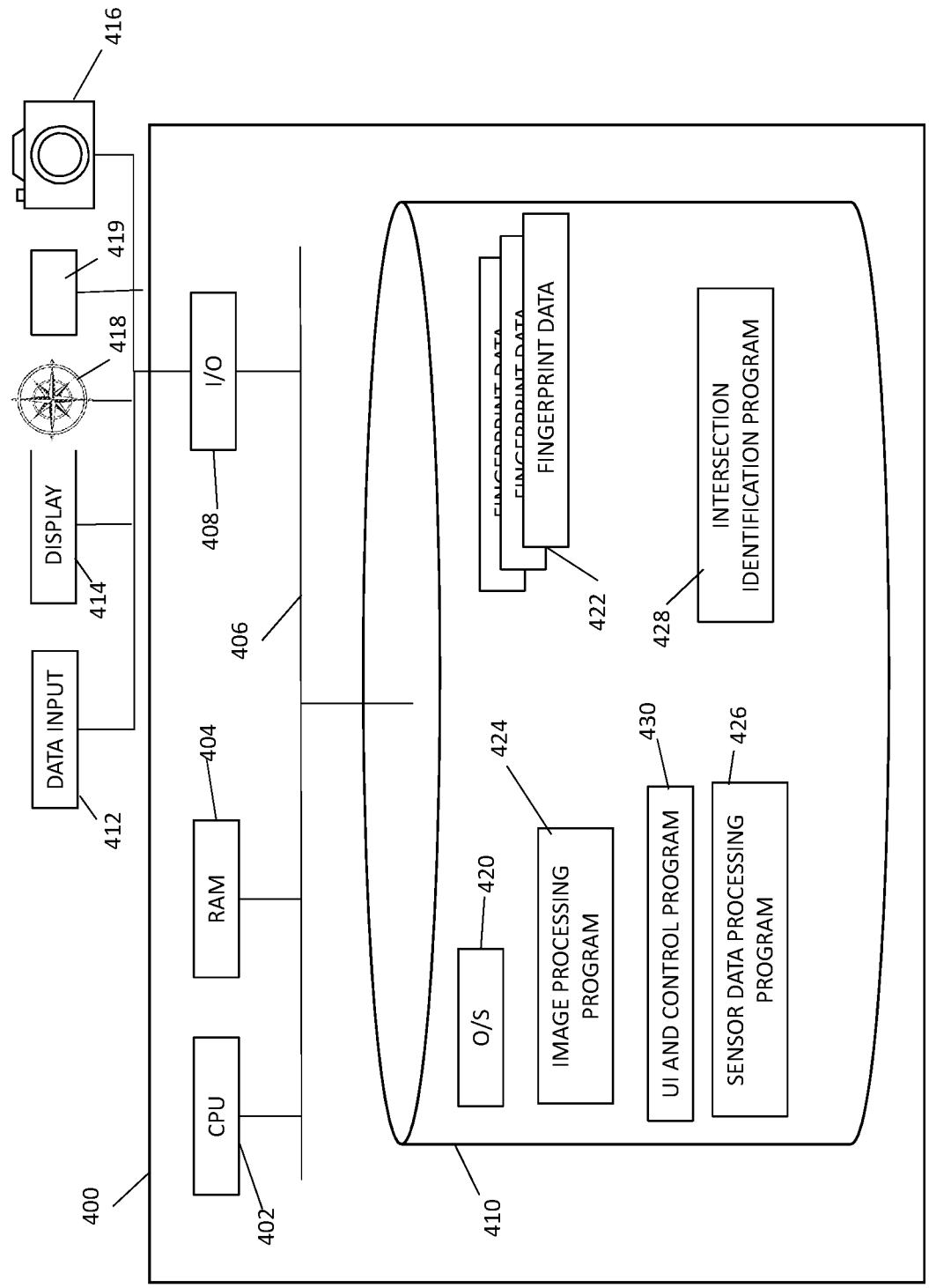
FIG. 4 is a block diagram illustrating a computer system on which the present invention may be implemented.

FIG. 4 illustrates an example of a general computing device 400 that may form the platform for embodiments of the invention. For example, the computing device 400 may be a mobile phone, a tablet, a wearable computing device, IVI system or the like. The computing device 400 comprises a central processing unit (CPU) 402 and a working memory 404, connected by a common bus 406, and having an input-output (I/O) interface 408 arranged to receive control inputs from a user via a device connected to a data input port 212 such as a keyboard, mouse, touchscreen, push button, or other controller, and provide output information via a user interface which is displayed on a visual display device 414. The I/O interface 408 is also arranged to receive further inputs via various other devices and sensors, including but not limited to an image capture device 416, a magnetometer 418, and an accelerometer.

The computing device 400 is also provided with a computer readable storage medium 410 such as a hard disk drive (HDD), flash drive, solid state drive, or any other form of general-purpose data storage, upon which stored fingerprint date 422 and various programs are arranged to control the computing device 400 to operate in accordance with embodiments of the present invention. For example, stored on the computer readable storage medium 410 is an operating system program 420 that when run by the CPU 402 allows the system to operate. Also provided is an image processing program 424, a sensor data processing program 426 and an intersection identification program 428 which together implement the geolocation of the present invention when run by the CPU 402, as will be described in more detail below. In order to interface with and control the image processing program 424, sensor data processing program 426 and intersection identification program 428, a user interface and control program 430 is also provided, that controls the computing device 400 to provide a visual output to the display 414, and to receive user inputs via any input means connected to the data input port 412, or any other device connected to the I/O interface 408 in order to control the image processing program 424, sensor data processing program 426 and intersection identification program 428.

Figure 5:
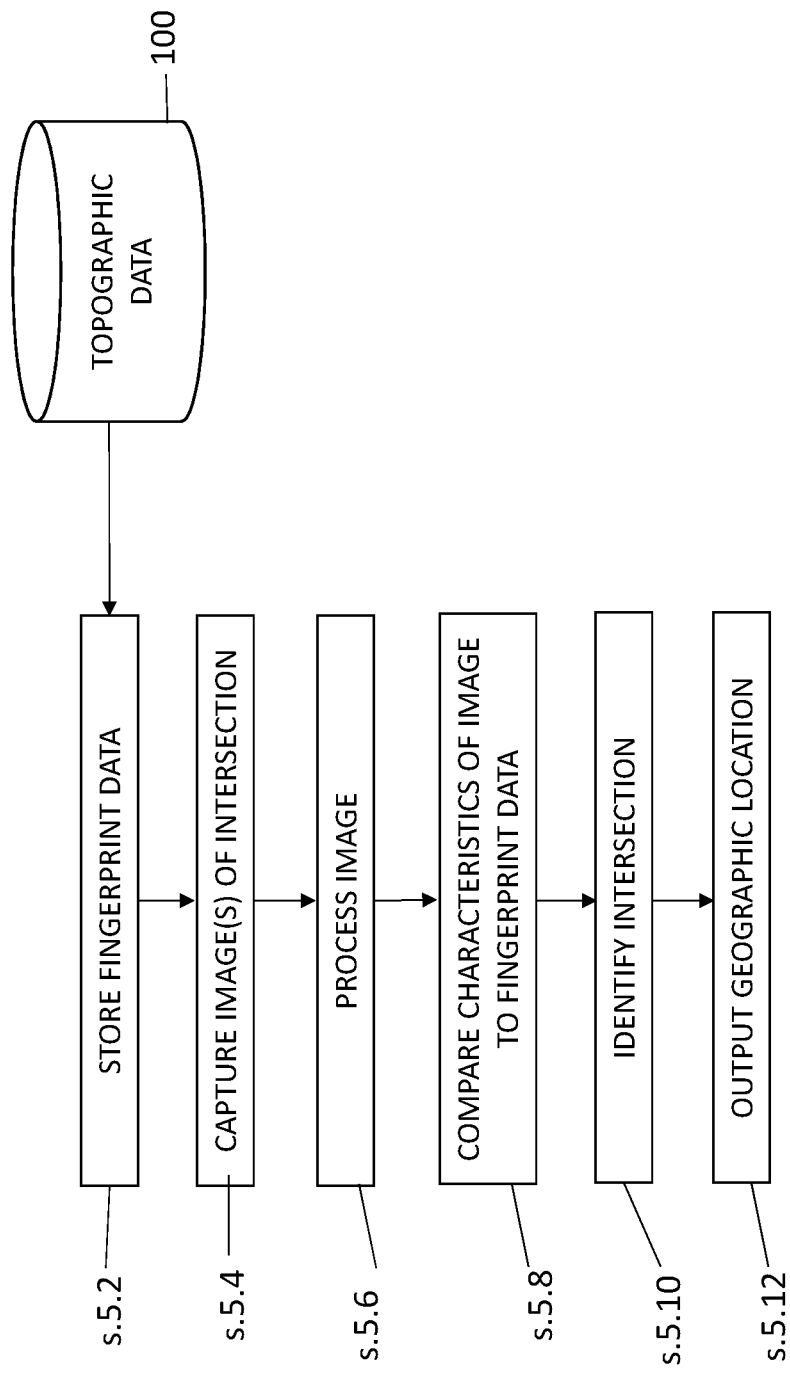
FIG. 5 is a flow diagram illustrating an embodiment of the present invention.

The computing device 400 is capable of performing a method of geolocation according to an embodiment of the present invention, which will now be described with reference to FIG. 5.

Once the computing device 400 has received and stored the fingerprint data 422 from the topographic database 100 (s.5.2), it may be used to determine the location of the computing device 400 in situations where there is no network or satellite signal available. In this embodiment, geolocation is achieved by capturing one or more images of intersecting features, such as a nearby road intersection, using the image capture device 416 (s.5.4). In this respect, the image capture device 416 may be integrated to the computing device 400 or it may be a separate device. For example, the computing device 400 may be a mobile phone with an integral camera feature, or the computing device 400 may be an IVI system connected to a separate on-board camera. As images of the intersection are captured, the image processing program 424 will be launched to process the image(s) and determine various characteristics of the intersection (s.5.6). During this processing, the image processing program 424 will identify the intersecting line features and determine the bearings therebetween. The image processing program 424 may also estimate the distance of the first link of each of the intersecting line features, for example, by detecting a point in the image where the line feature begins to bend. The image processing program 424 may also identify other features of the intersection such as buildings, road signs, man-made structures, vegetation, land marks and the like. Once the relevant characteristics of the intersection have been determined from the image(s), the intersection identification program 428 will be launched to compare the determined characteristics of the intersection to the stored fingerprint data 422 (s.5.8), and thereby identify a matching intersection (s.5.10). Once a match has been identified, the intersection identification program 428 can extract the geographic location embedded in the matching fingerprint and output the geographic location to the user, for example, via the display device 414.

If only the bearings of the intersecting features are used, for example, in situations where it is not possible for the image processing program 424 to estimate the distance of the first link or identify any other characteristics of the intersection, such as in dark or foggy conditions, the intersection identification program 428 will at least provide a shortlist of six or fewer possible geographic locations that the user could be in. In most cases, the user will be able to determine their location from a small selection based on the knowledge of their previous location. For example, the intersection identification program 428 may output three locations in different regions of the country, such as Oxford, Sheffield, and Exeter. The user may know that they had been in Swindon approximately an hour before, and can therefore conclude that they are mostly likely in the Oxford location. Alternatively, the intersection identification program 428 may use historical location data stored in the computing device 400 to determine the correct location. For example, the intersection identification program 428 might use the last available timestamped location from the navigation system (not shown) of the computing device 400. In another example, the intersection identification program 428 may use the last location that it identified to determine the correct location.

Figure 6:
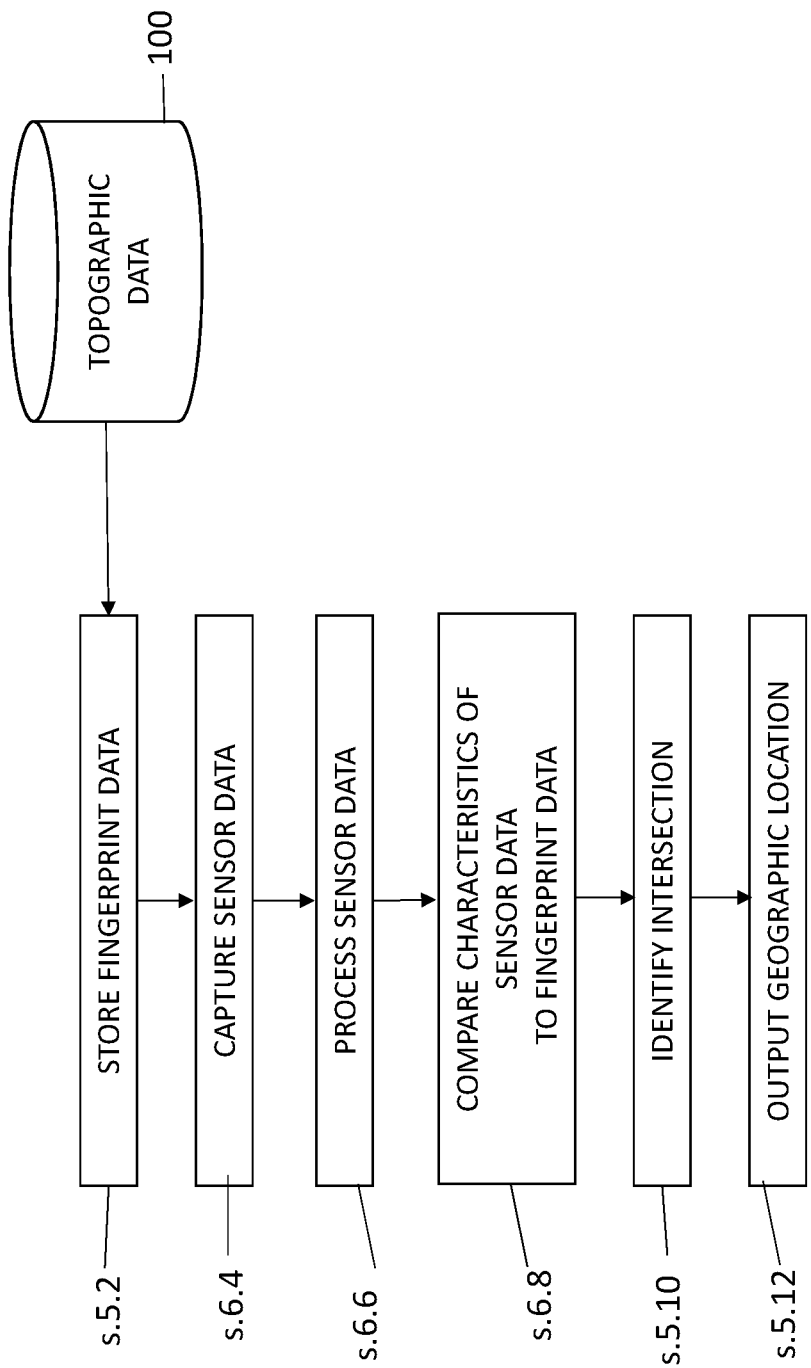
FIG. 6 is a flow diagram illustrating a further embodiment of the present invention.

The computing device 400 is capable of performing a method of geolocation according to a further embodiment of the present invention, which will now be described with reference to FIG. 6.

As before, once the computing device 400 has received and stored the fingerprint data 422 from the topographic database 100 (s.5.2), it may be used to determine the location of the computing device 400 in situations where there is no network or satellite signal available. In this embodiment, geolocation is achieved by capturing sensor data at a nearby road intersection using other sensing devices of the computing device 400 (s.6.4). For example, sensor data may be captured by a magnetometer 418 capable of measuring the bearings between the intersecting roads. Additionally, an accelerometer 419 capable of measuring a distance as the user walks along the intersecting features may also be used to estimate the length of the first link. As sensor data is captured, the sensor data processing program 426 will be launched to process the received sensor data and determine various characteristics of the intersection (s.6.6). Once the characteristics of the intersection have been determined from the sensor data, the intersection identification program 428 will be launched to compare the determined characteristics to the stored fingerprint data 422 (s.6.8), and thereby identify a matching intersection (s.5.10). Once a match has been identified, the intersection identification program 428 can extract the geographic location embedded in the matching fingerprint and output the geographic location to the user, for example, via the display device 414.

Again, if only the bearings of the intersecting features are used to determine the location, for example, in situations where it is not possible to estimate the distance of the first link, for example, the intersecting roads are not safe for the user to walk along, the intersection identification program 428 will at least provide a shortlist of six or fewer possible geographic locations that the user could be. In most cases, the user will be able to determine their location from a small selection based on the knowledge of their previous location, as described above. Alternatively, the intersection identification program 428 may use historical location data stored in the computing device 400 to determine the correct location. For example, the intersection identification program 428 might use the last available timestamped location from the navigation system (not shown) of the computing device 400. In another example, the intersection identification program 428 may use the last location that it identified to determine the correct location.

In some embodiments, a combination of different input data may be used to identify the intersection from the fingerprint data 422. For example, sensor data measured by the magnetometer 418 may be used to calculate the bearings between the intersecting roads, whilst an image captured by the image capture device 416 may be processed to identify other features of the intersection, such as the distance of the first link, as well as road signs, buildings, man-made structures, vegetation, landmarks or the like.

Various modifications, whether by way of addition, deletion and/or substitution, may be made to all of the above described embodiments to provide further embodiments, any and/or all of which are intended to be encompassed by the appended claims.

The invention claimed is:

1. A computer-implemented method of geolocation, the method comprising:
storing a set of unique identifiers corresponding to a plurality of intersections located in a geographic area, an intersection being represented by a node having three or more topographic line features extending therefrom, wherein an identifier comprises information relating to one or more characteristics of the corresponding intersection and a geographical location, wherein the one or more characteristics comprise at least a plurality of bearings, a bearing being measured for each of the line features of a respective intersection;
obtaining data relating to a first intersection of unknown geographic location, the first intersection comprising a plurality of linear features extending about a point of intersection;
processing the received data to determine one or more characteristics of the first intersection, wherein the one or more characteristics comprise at least a first set of bearings, a bearing being determined for each of the linear features;
comparing one or more characteristics of the first intersection to one or more characteristics of the set of unique identifiers, wherein the first set of bearings are compared to the plurality of bearings corresponding to each unique identifier; and
identifying an identifier having at least the same set of bearings as the first intersection and determining the geographic location of the first intersection therefrom.

2. A method according to claim 1, wherein the one or more characteristics further comprises geometric data comprising a length of at least a part of the three or more line features.

3. A method according to claim 1, wherein the obtaining data relating to a first intersection comprises capturing one or more images of the first intersection.

4. A method according to claim 3, wherein the processing the data comprises processing the one or more images to determine the characteristics of the first intersection.

5. A method according to claim 1, wherein the obtaining data relating to a first intersection comprises using at least one sensor to obtain a geometric measurement of the first intersection.

6. A method according to claim 5, wherein the at least one sensor comprises a magnetometer and/or an accelerometer.

7. A method according to claim 1, further comprising generating the set of unique identifiers based on a topographic dataset, wherein an intersection is represented by a node having three or more line features extending therefrom.

8. A method according to claim 7, wherein the generating the set of unique identifiers comprises measuring a plurality of bearings for each intersection, a bearing being measured for each of the line features.

9. A method according to claim 8, wherein the generating the set of unique identifiers further comprises measuring a length of at least a part of the three or more line features.

10. A method according to claim 7, wherein the line features are representative of one or more of: a road, a path, a river, a hedge, a bridge and a railway track.

11. A method according to claim 1, wherein the one or more characteristics further comprise one or more of: a road sign, a building, a man-made structure, vegetation and a landmark.

12. A system comprising:
a processor; and
a computer readable medium storing one or more instruction(s) arranged such that when executed the processor is caused to:
store a set of unique identifiers corresponding to a plurality of intersections located in a geographic area, an intersection being represented by a node having three or more topographic line features extending therefrom, wherein an identifier comprises information relating to one or more characteristics of the corresponding intersection and a geographical location, wherein the one or more characteristics comprise at least a plurality of bearings, a bearing being measured for each of the line features of a respective intersection;

obtain data relating to a first intersection of unknown geographic location, the first intersection comprising a plurality of linear features extending about a point of intersection;

process the received data to determine one or more characteristics of the first intersection, wherein the one or more characteristics comprise at least a first set of bearings, a bearing being determined for each of the linear features;

compare one or more characteristics of the first intersection to one or more characteristics of the set of unique identifiers, wherein the first set of bearings are compared to the plurality of bearings corresponding to each unique identifier; and identify an identifier having at least the same set of bearings as the first intersection and determining the geographic location of the first intersection therefrom.

13. A system according to claim 12, wherein the processor is further configured to use data from at least one sensor to obtain a geometric measurement of the first intersection to thereby obtain data relating to the first intersection.

14. A system according to claim 13, wherein the at least one sensor comprises a magnetometer and/or an accelerometer.

15. A system according to claim 12, wherein the processor is further configured to generate the set of unique identifiers based on a topographic dataset, wherein an intersection is represented by a node having three or more line features extending therefrom.

16. A system according to claim 15, wherein the processor is configured to generate the set of unique identifiers by measuring a plurality of bearings for each intersection, a bearing being measured for each of the line features.

17. A system according to claim 16, wherein the generating the set of unique identifiers further comprises measuring a length of at least a part of the three or more line features.

\* \* \* \* \*